(12) United States Patent
Ma

(10) Patent No.: US 10,099,511 B2
(45) Date of Patent: Oct. 16, 2018

(54) PRESSURED BRAKING WHEEL

(71) Applicant: Hung Trien Ma, City of Industry, CA (US)

(72) Inventor: Hung Trien Ma, City of Industry, CA (US)

( * ) Notice: Subject to any disclaimer, the term of this patent is extended or adjusted under 35 U.S.C. 154(b) by 0 days.

(21) Appl. No.: 15/467,314

(22) Filed: Mar. 23, 2017

(65) Prior Publication Data
US 2018/0162162 A1 Jun. 14, 2018

(30) Foreign Application Priority Data

Dec. 14, 2016 (CN) ..................... 2016 2 1376008 U

(51) Int. Cl.
*B60B 33/00* (2006.01)
*B60B 21/08* (2006.01)
*B60B 37/10* (2006.01)

(52) U.S. Cl.
CPC .......... *B60B 33/0086* (2013.01); *B60B 21/08* (2013.01); *B60B 33/0042* (2013.01); *B60B 33/0049* (2013.01); *B60B 33/0094* (2013.01); *B60B 37/10* (2013.01); *B60B 2200/222* (2013.01); *B60B 2900/531* (2013.01)

(58) Field of Classification Search
CPC . Y10T 16/195; Y10T 16/196; B60B 33/0094; B60B 33/0039; B60B 33/0049; B60B 33/0084; B60B 33/0092; B60B 33/025; B60B 33/021; B60B 33/0042; B60B 33/0078; B60B 33/0086; B60B 37/10; B60B 2200/222; B60B 2900/531; A61G 7/0528

See application file for complete search history.

(56) References Cited

U.S. PATENT DOCUMENTS 4,290,166 A * 9/1981 Melara ................ B60B 33/0028
                                          16/18 CG
4,455,707 A * 6/1984 Screen ................ B60B 33/0042
                                          16/35 R
4,821,369 A * 4/1989 Daniels ............... B60B 33/0042
                                          16/35 R (Continued)

FOREIGN PATENT DOCUMENTS

CN      103640433 A  *  3/2014
JP       09305104 A  *  11/1997

*Primary Examiner* — Chuck Y Mah
(74) *Attorney, Agent, or Firm* — Muncy, Geissler, Olds & Lowe, P.C.

(57) ABSTRACT

A pressured braking wheel includes a wheel seat, an axle sleeve, a first wheel rim and a second wheel rim. The wheel seat has an accommodation space and a braking tenon. The axle sleeve is arranged in the accommodation space and sleeves a wheel axle. Inner sides of the first wheel rim and the second wheel rim are respectively annularly provided with first tenon grooves and second tenon grooves. The first wheel rim and the second wheel rim pivotally connect with the axle sleeve through the wheel axle. The first tenon groove and the second tenon groove are arranged under the braking tenon. When the wheel seat is pressed down, the wheel seat inserts the braking tenon into the first tenon groove and the second tenon groove, so as to prevent the first wheel rim and the second wheel rim from rotating with respect to the wheel seat.

9 Claims, 5 Drawing Sheets

(56) References Cited

U.S. PATENT DOCUMENTS

| | | | | |
|---|---|---|---|---|
| 5,355,550 | A * | 10/1994 | Yang | B60B 33/0002 16/35 R |
| 5,617,934 | A * | 4/1997 | Yang | B60B 33/0042 16/35 R |
| 6,092,262 | A * | 7/2000 | Lin | B60B 33/0084 16/19 |
| 6,256,835 | B1 * | 7/2001 | Wang | B60B 33/001 16/35 D |
| 2001/0039693 | A1 * | 11/2001 | Melara | B60B 33/0007 16/35 R |
| 2005/0108851 | A1 * | 5/2005 | Dayt | B60B 33/0021 16/31 R |
| 2009/0049647 | A1 * | 2/2009 | Berger | B60B 33/001 16/35 R |
| 2015/0047148 | A1 * | 2/2015 | Melara | B60B 33/0028 16/47 |

\* cited by examiner

PRESSURED BRAKING WHEEL

This application claims priority for China patent application no. 201621376008.9 filed on Dec. 14, 2016, the content of which is incorporated by reference in its entirely.

BACKGROUND OF THE INVENTION

Field of the Invention

The present invention relates to a braking wheel, particularly to a pressured braking wheel.

Description of the Related Art

With the development and population of computers, the computers deeply involves with daily life, performs document processing, and achieves communication, search and capability for controlling peripheral devices via the network whose influence reaches far. Thus, under the influence of computers, the time and need that users rely on computers increase more. In order to more comfortably operate computers, the improvement for a using environment is the necessary demand.

In order to comfortably use computers, people have to use computer chairs. However, when people sit on computer chairs and concentrate to use computers, they expect to fix the computer chairs rather than move the chairs freely since the present computer chairs are not provided with braking design. For example, a computer chair includes a front chair frame and a rear chair frame. The front chair frame extends downward to form a foot rod, which is pivotally provided with a knee cushion. A bottom of the knee cushion is pivotally provided with a support rod. The front chair frame is provided with a plurality of holes. The support rod of the knee cushion penetrates through the holes. The front chair frame is provided with a connection rod having a plurality of holes, so as to connect with the rear chair frame. The rear chair frame also extends downward to form a foot rod, which is pivotally provided with a seat cushion and a back frame having a back cushion. The rear chair frame is provided with an assembly rod which sleeves the connection rod of the front chair frame. A side surface of the assembly rod is provided with a plurality of holes which are inserted with bolts. A bottom of a seat cushion is provided with a support rod which pushes against the rear chair frame. A positioning plate is provided in a place corresponding to the rear chair frame and the back frame. The positioning plate is provided with a plurality of through holes distributed on an arc. The back frame is provided with bolts that can penetrate through the through holes and the positioning plate, whereby the tilted angles of the knee cushion, the seat cushion, and the back cushion are freely adjusted according to requirement. Besides, the foot rods of the front chair frame and the rear chair frame are provided with roll wheels. The roll wheels do not be provided with any braking design.

To overcome the abovementioned problems, the present invention provides a pressured braking wheel, so as to solve the afore-mentioned problems of the prior art.

SUMMARY OF THE INVENTION

A primary objective of the present invention is to provide a pressured braking wheel, which inserts a braking tenon into tenon grooves of a first wheel rim and a second wheel rim to conveniently achieve braking in a humanistic way when a wheel seat is pressed down by an external force.

To achieve the abovementioned objectives, the present invention provides a pressured braking wheel, which comprises a wheel seat, an axle sleeve, an elastic body, a first wheel rim, a second wheel rim, a first axle sleeve cover, a second axle sleeve cover and a plurality of fixing members. For example, the elastic body is a spring. An upper part of the wheel seat is penetrated with an accommodation space and a lower part of the wheel seat has a braking tenon. For example, the braking tenon has a shape of an arc or a wedge. The axle sleeve is penetrated with an axle hole, and the axle hole sleeves a wheel axle, and the axle sleeve is arranged on the wheel seat and in the accommodation space. Besides, a top of the axle sleeve extends upward to form a post, and the elastic body is arranged on the post. The elastic body is arranged on the top of the axle sleeve and in the accommodation space and abuts against the wheel seat. The first wheel rim is coaxially fixed to a first hollow sleeve, and an inner side of the first wheel rim is annularly provided with a plurality of first tenon grooves, and the first hollow sleeve sleeves the wheel axle and pivotally connects with the axle hole through the wheel axle, and the first tenon groove is arranged under the braking tenon. The second wheel rim is coaxially fixed to a second hollow sleeve, and an inner side of the second wheel rim is annularly provided with a plurality of second tenon grooves, and the second hollow sleeve sleeves the wheel axle and pivotally connects with the axle hole through the wheel axle, and the first wheel rim and the second wheel rim are respectively arranged at two opposite sides of the wheel seat, and the second tenon groove is arranged under the braking tenon. When the wheel seat is pressed down by an external force, the wheel seat pushes against the elastic body to insert the braking tenon into the first tenon groove and the second tenon groove, so as to prevent the first wheel rim, the first hollow sleeve, the second wheel rim and the second hollow sleeve from rotating with respect to the wheel seat. When the external disappears, the elastic body pushes against the wheel seat to separate the braking tenon from the first tenon groove and the second tenon groove, so as to rotate the first wheel rim, the first hollow sleeve, the second wheel rim and the second hollow sleeve with respect to the wheel seat.

The first axle sleeve cover is penetrated with a first through hole and a plurality of first fixing holes, and the first fixing holes are arranged around the first through hole. The largest hole diameter of the first through hole is larger than the largest cross-section diameter of the wheel axle, whereby the wheel axle penetrates through the first through hole. The wheel seat is further penetrated with a plurality second fixing holes. The second axle sleeve cover is penetrated with a second through hole and a plurality of third fixing holes. The third fixing holes are arranged around the second through hole. The largest hole diameter of the second through hole is larger than the largest cross-section diameter of the wheel axle, whereby the wheel axle penetrates through the second through hole. The fixing members respectively penetrate through the first fixing holes of the first axle sleeve cover, respectively penetrate through the second fixing holes of the wheel seat, and are respectively fixed to the second fixing holes and respectively fixed to the third fixing holes of the second axle sleeve cover, whereby the first axle sleeve cover and the second axle sleeve cover are fixed to the wheel seat, and whereby the first axle sleeve cover is arranged between the wheel seat and the first wheel rim, and whereby the second axle sleeve cover is arranged between the wheel seat and the second wheel rim. For example, the fixing members are screws, and the first fixing holes and the second fixing holes and the third fixing holes are screw holes.

Below, the embodiments are described in detail in cooperation with the drawings to make easily understood the technical contents, characteristics and accomplishments of the present invention.

DETAILED DESCRIPTION OF THE INVENTION

Figure 1:
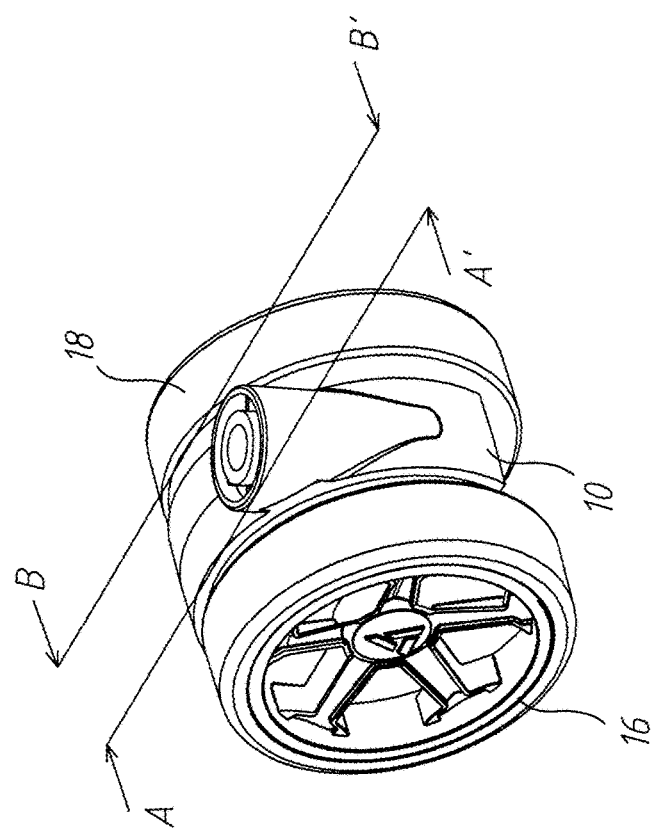
FIG. 1 is a perspective view of a pressured braking wheel according to an embodiment of the present invention.
Figure 2:
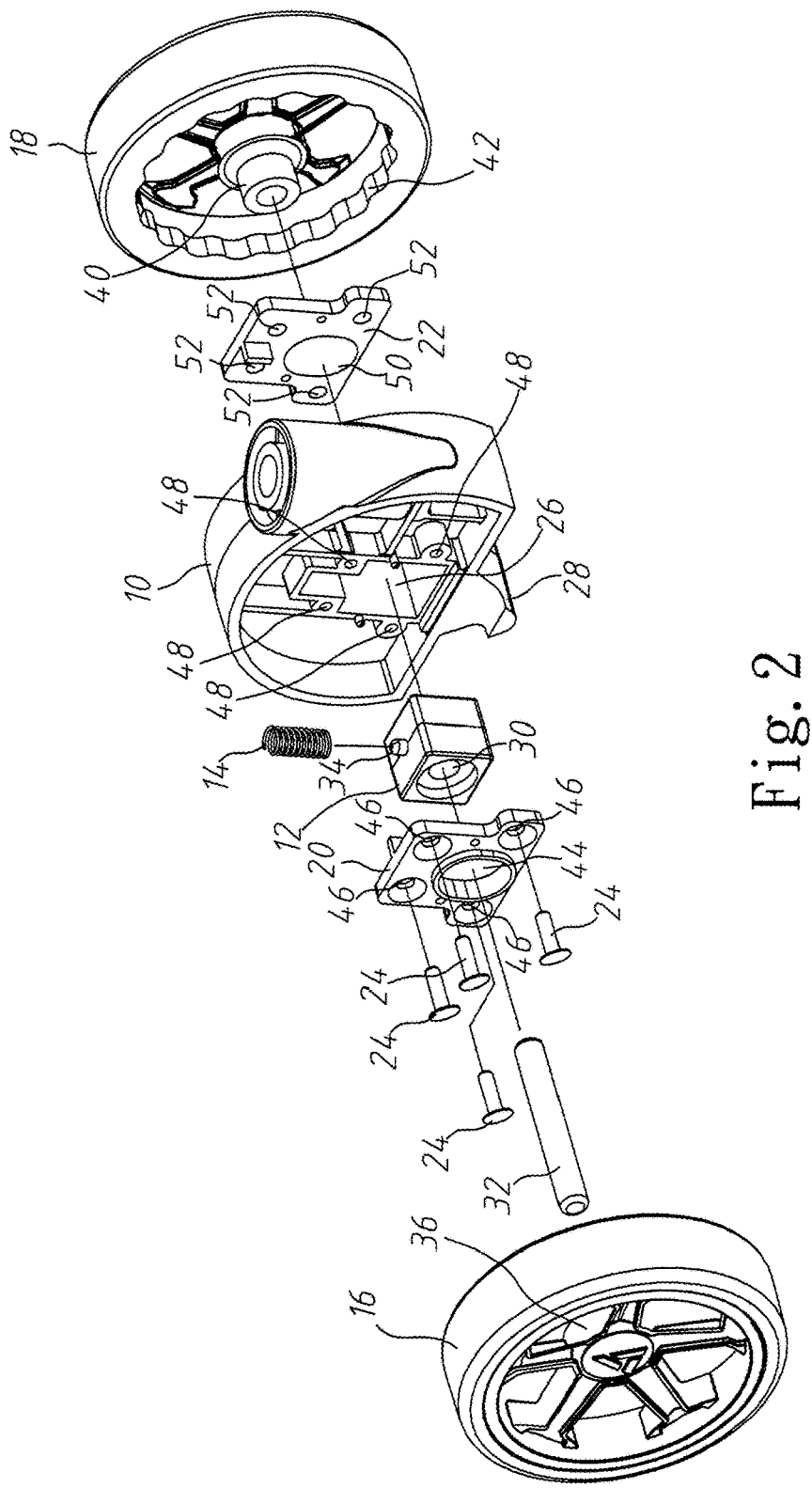
FIG. 2 is an exploded view of a pressured braking wheel according to an embodiment of the present invention.
Figure 4:
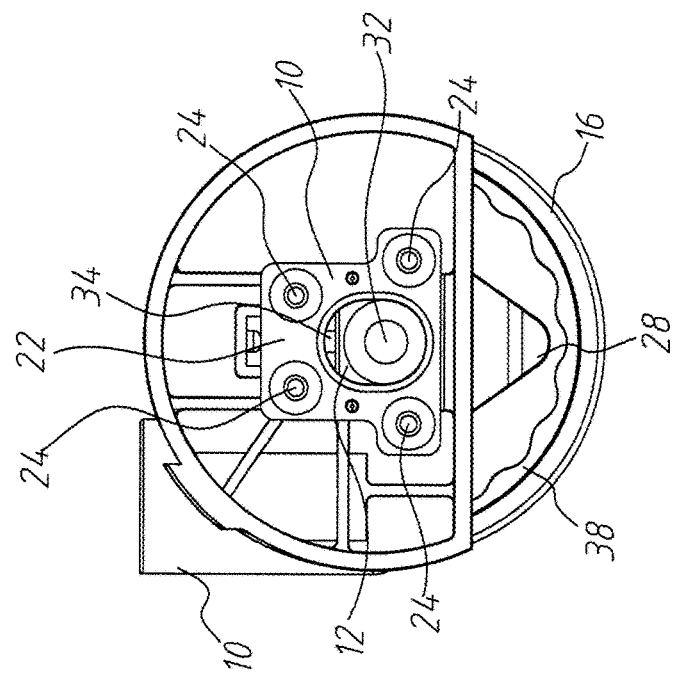
FIG. 4 is a sectional view of a pressured braking wheel taken along Line B-B' of FIG. 1.
Figure 3:
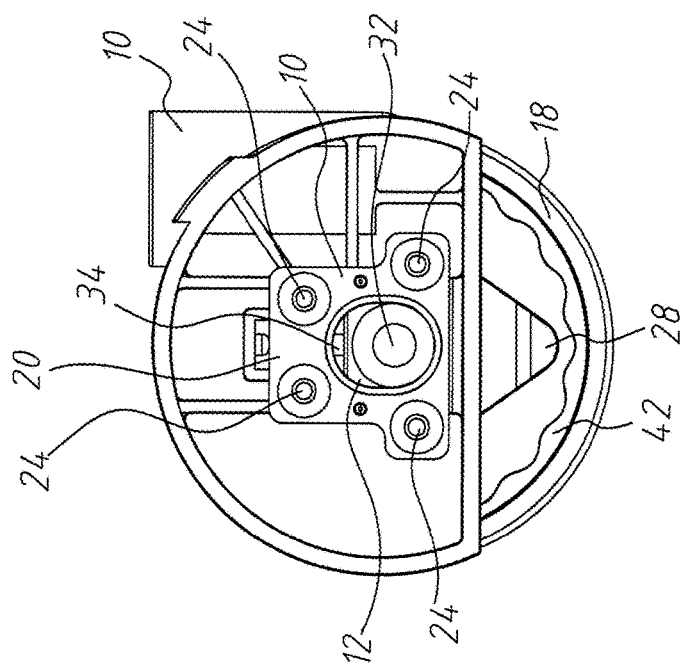
FIG. 3 is a sectional view of a pressured braking wheel taken along Line A-A' of FIG. 1.

Reference will now be made in detail to embodiments illustrated in the accompanying drawings. Wherever possible, the same reference numbers are used in the drawings and the description to refer to the same or like parts. In the drawings, the shape and thickness may be exaggerated for clarity and convenience. This description will be directed in particular to elements forming part of, or cooperating more directly with, methods and apparatus in accordance with the present disclosure. It is to be understood that elements not specifically shown or described may take various forms well known to those skilled in the art. Many alternatives and modifications will be apparent to those skilled in the art, once informed by the present disclosure.

Refer to FIG. 1, FIG. 2, FIG. 3 and FIG. 4 to introduce a pressured braking wheel of the present invention. The pressured braking wheel of the present invention comprises a wheel seat 10, an axle sleeve 12, an elastic body 14, a first wheel rim 16, a second wheel rim 18, a first axle sleeve cover 20, a second axle sleeve cover 22 and a plurality of fixing members 24. For example, the elastic body 14 is a spring. An upper part of the wheel seat 10 is penetrated with an accommodation space 26 and a lower part of the wheel seat 10 has a braking tenon 28. For example, the braking tenon 28 has a shape of an arc or a wedge. The axle sleeve 12 is penetrated with an axle hole 30, and the axle hole 30 sleeves a wheel axle 32, and the axle sleeve 12 is arranged on the wheel seat 10 and in the accommodation space 26. Besides, a top of the axle sleeve 12 extends upward to form a post 34, and the elastic body 14 is arranged on the post 34.

The elastic body 14 is arranged on the top of the axle sleeve 12 and in the accommodation space 26 and abuts against the wheel seat 10. The first wheel rim 16 is coaxially fixed to a first hollow sleeve 36, and an inner side of the first wheel rim 16 is annularly provided with a plurality of first tenon grooves 38, and the first hollow sleeve 36 sleeves the wheel axle 32 and pivotally connects with the axle hole 30 through the wheel axle 32, and the first tenon groove 38 is arranged under the braking tenon 28. The second wheel rim 18 is coaxially fixed to a second hollow sleeve 40, and an inner side of the second wheel rim 18 is annularly provided with a plurality of second tenon grooves 42, and the second hollow sleeve 40 sleeves the wheel axle 32 and pivotally connects with the axle hole 30 through the wheel axle 32, and the first wheel rim 16 and the second wheel rim 18 are respectively arranged at two opposite sides of the wheel seat 10, and the second tenon groove 42 is arranged under the braking tenon 28. When the wheel seat 10 is pressed down by an external force, the wheel seat 10 pushes against the elastic body 14 to insert the braking tenon 28 into the first tenon groove 38 and the second tenon groove 42, so as to prevent the first wheel rim 16, the first hollow sleeve 36, the second wheel rim 18 and the second hollow sleeve 40 from rotating with respect to the wheel seat 10. When the external disappears, the elastic body 14 pushes against the wheel seat 10 to separate the braking tenon 28 from the first tenon groove 38 and the second tenon groove 42, so as to rotate the first wheel rim 16, the first hollow sleeve 36, the second wheel rim 18 and the second hollow sleeve 40 with respect to the wheel seat 10.

The first axle sleeve cover 20 is penetrated with a first through hole 44 and a plurality of first fixing holes 46, and the first fixing holes 46 are arranged around the first through hole 44. The largest hole diameter of the first through hole 44 is larger than the largest cross-section diameter of the wheel axle 32, whereby the wheel axle 32 penetrates through the first through hole 44. The first through hole 44 is used to limit the space that the wheel axle 32 moves. The wheel seat 10 is further penetrated with a plurality second fixing holes 48. The second axle sleeve cover 22 is penetrated with a second through hole 50 and a plurality of third fixing holes 52. The third fixing holes 52 are arranged around the second through hole 50. The largest hole diameter of the second through hole 50 is larger than the largest cross-section diameter of the wheel axle 32, whereby the wheel axle 32 penetrates through the second through hole 50. The second through hole 50 is used to limit the space that the wheel axle 32 moves. The fixing members 24 respectively penetrate through the first fixing holes 46 of the first axle sleeve cover 20, respectively penetrate through the second fixing holes 48 of the wheel seat 10, and are respectively fixed to the second fixing holes 48 and respectively fixed to the third fixing holes 52 of the second axle sleeve cover 22, whereby the first axle sleeve cover 20 and the second axle sleeve cover 22 are fixed to the wheel seat 10, and whereby the first axle sleeve cover 20 is arranged between the wheel seat 10 and the first wheel rim 16, and whereby the second axle sleeve cover 22 is arranged between the wheel seat 10 and the second wheel rim 18. For example, the fixing members 24 are screws, and the first fixing holes 46 and the second fixing holes 48 and the third fixing holes 52 are screw holes.

Figure 6:
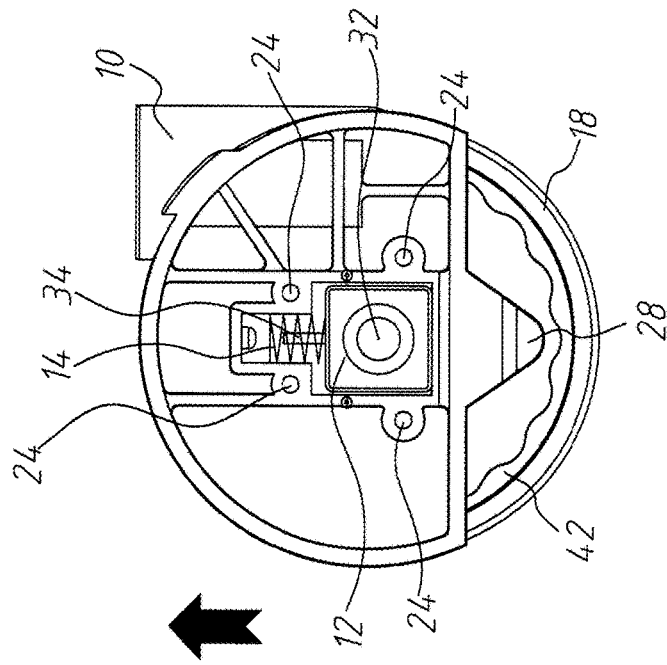
FIG. 6 is a diagram schematically showing related positions of a second wheel rim, an axle sleeve and a wheel seat when an external force is not applied according to an embodiment of the present invention.
Figure 5:
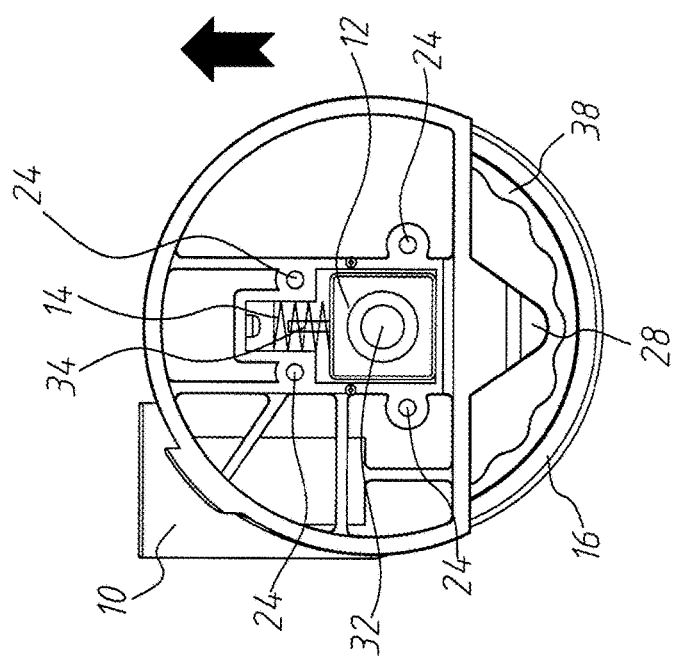
FIG. 5 is a diagram schematically showing related positions of a first wheel rim, an axle sleeve and a wheel seat when an external force is not applied according to an embodiment of the present invention.
Figure 7:
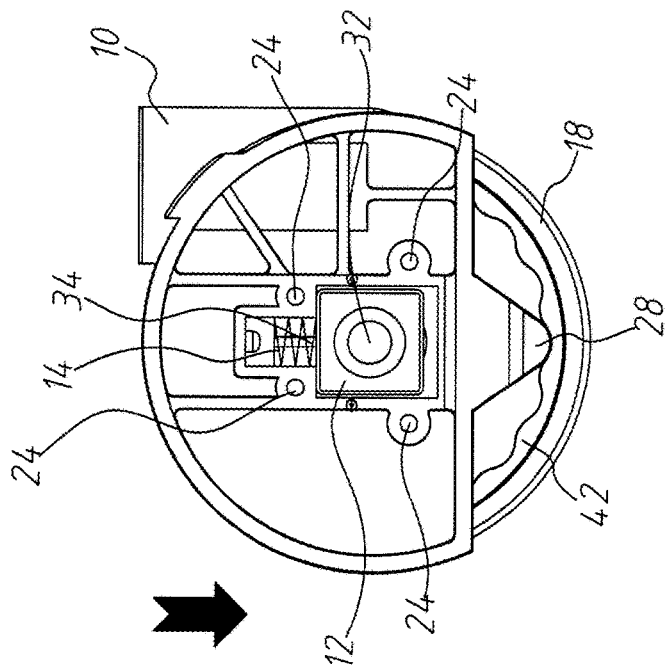
FIG. 7 is a diagram schematically showing related positions of a first wheel rim, an axle sleeve and a wheel seat when an external force is applied according to an embodiment of the present invention.
Figure 8:
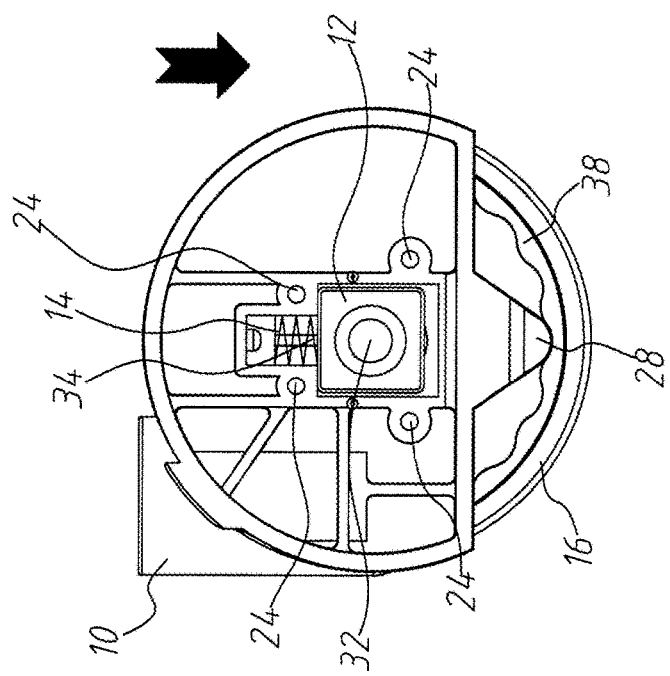
FIG. 8 is a diagram schematically showing related positions of a second wheel rim, an axle sleeve and a wheel seat when an external force is applied according to an embodiment of the present invention.

The operation of the pressured braking wheel of the present invention is introduced as below. Refer to FIG. 5 and FIG. 6. Firstly, when the wheel seat 10 does not receive any pressure, the elastic body 14 pushes against the wheel seat 10 to separate the braking tenon 28 from the first tenon groove 38 and the second tenon groove 42, so as to rotate the first wheel rim 16, the first hollow sleeve 36, the second wheel rim 18 and the second hollow sleeve 40 with respect to the wheel seat 10. For example, the wheel seat 10 of the pressured braking wheel of the present invention is installed on a bottom of a computer chair. When a user uses the computer chair, the user moves the computer chair to a fixed position using the pressured braking wheel. Then, as shown in FIG. 7 and FIG. 8, the user sits on the computer chair, whereby the wheel seat 10 is pressed down by an external force. Simultaneously, the wheel seat 10 pushes against the elastic body 14 to insert the braking tenon 28 into the first tenon groove 38 and the second tenon groove 42, so as to prevent the first wheel rim 16, the first hollow sleeve 36, the second wheel rim 18 and the second hollow sleeve 40 from rotating with respect to the wheel seat 10. As a result, the computer chair is fixed to the fixed position to conveniently achieve braking in a humanistic way, and the user can concentrate on using a computer. If the user leaves the computer, the external force disappears. Simultaneously, as shown in FIG. 5 and FIG. 6, the elastic body 14 pushes against the wheel seat 10 to separate the braking tenon 28 from the first tenon groove 38 and the second tenon groove 42, so as to rotate the first wheel rim 16, the first hollow sleeve 36, the second wheel rim 18 and the second hollow sleeve 40 with respect to the wheel seat 10.

In conclusion, the present invention inserts the braking tenon into the tenon grooves of the first wheel rim and the second wheel rim, so as to achieve the braking purpose in a humanistic way.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A pressured braking wheel comprising:
   a wheel seat with an upper part thereof penetrated with an accommodation space and a lower part thereof having a braking tenon;
   an axle sleeve penetrated with an axle hole, and said axle hole sleeves a wheel axle, and said axle sleeve is arranged on said wheel seat and in said accommodation space;
   an elastic body arranged on a top of said axle sleeve and in said accommodation space and abutting against said wheel seat;
   a first wheel rim coaxially fixed to a first hollow sleeve, and an inner side of said first wheel rim is annularly provided with a plurality of first tenon grooves, and said first hollow sleeve sleeves said wheel axle and pivotally connects with said axle hole through said wheel axle, and said first tenon groove is arranged under said braking tenon;
   a second wheel rim coaxially fixed to a second hollow sleeve, and an inner side of said second wheel rim is annularly provided with a plurality of second tenon grooves, and said second hollow sleeve sleeves said wheel axle and pivotally connects with said axle hole through said wheel axle, and said first wheel rim and said second wheel rim are respectively arranged at two opposite sides of said wheel seat, and said second tenon groove is arranged under said braking tenon, and when said wheel seat is pressed down by an external force, said wheel seat pushes against said elastic body to insert said braking tenon into said first tenon groove and said second tenon groove, so as to prevent said first wheel rim, said first hollow sleeve, said second wheel rim and said second hollow sleeve from rotating with respect to said wheel seat, and when said external disappears, said elastic body pushes against said wheel seat to separate said braking tenon from said first tenon groove and said second tenon groove, so as to rotate said first wheel rim, said first hollow sleeve, said second wheel rim and said second hollow sleeve with respect to said wheel seat; and
   a first axle sleeve cover penetrated with a first through hole, and a largest hole diameter of said first through hole is larger than a largest cross-section diameter of said wheel axle, and said wheel axle penetrates through said first through hole, and said first axle sleeve cover is fixed to said wheel seat using a plurality of fixing members, and said first axle sleeve cover is arranged between said wheel seat and said first wheel rim.

2. The pressured braking wheel according to claim 1, wherein said first axle sleeve cover is further penetrated with a plurality of first fixing holes, and said first fixing holes are arranged around said first through hole, and said fixing members respectively penetrate through said first fixing holes, and said fixing members are fixed to said wheel seat, so as to fix said first axle sleeve cover to said wheel seat.

3. The pressured braking wheel according to claim 2, wherein said fixing members are screws, and said first fixing holes are screw holes.

4. The pressured braking wheel according to claim 2, further comprising a second axle sleeve cover penetrated with a second through hole, and a largest hole diameter of said second through hole is larger than said largest cross-section diameter of said wheel axle, and said wheel axle penetrates through said second through hole, and said wheel seat is further penetrated with a plurality second fixing holes, and said fixing members respectively penetrate through said second fixing holes, and said fixing members are fixed to said second axle sleeve cover, so as to fix said second axle sleeve cover to said wheel seat, and said second axle sleeve cover is arranged between said wheel seat and said second wheel rim.

5. The pressured braking wheel according to claim 4, wherein said second axle sleeve cover is further penetrated with a plurality of third fixing holes, and said third fixing holes are arranged around said second through hole, and said fixing members are respectively inserted into said third fixing holes, and said fixing members are fixed to said wheel seat, so as to fix said second axle sleeve cover to said wheel seat.

6. The pressured braking wheel according to claim 5, wherein said fixing members are screws, and said second fixing holes and said third fixing holes are screw holes.

7. The pressured braking wheel according to claim 1, wherein said top of said axle sleeve extends upward to form a post, and said elastic body is arranged on said post.

8. The pressured braking wheel according to claim 1, wherein said braking tenon has a shape of an arc or a wedge.

9. The pressured braking wheel according to claim 1, wherein said elastic body is a spring.

* * * * *